(No Model.)
G. W. & G. S. HUNGERFORD.
MACHINE FOR TREATING AND BAGGING COFFEE.
No. 259,545. Patented June 13, 1882.
Fig. 1
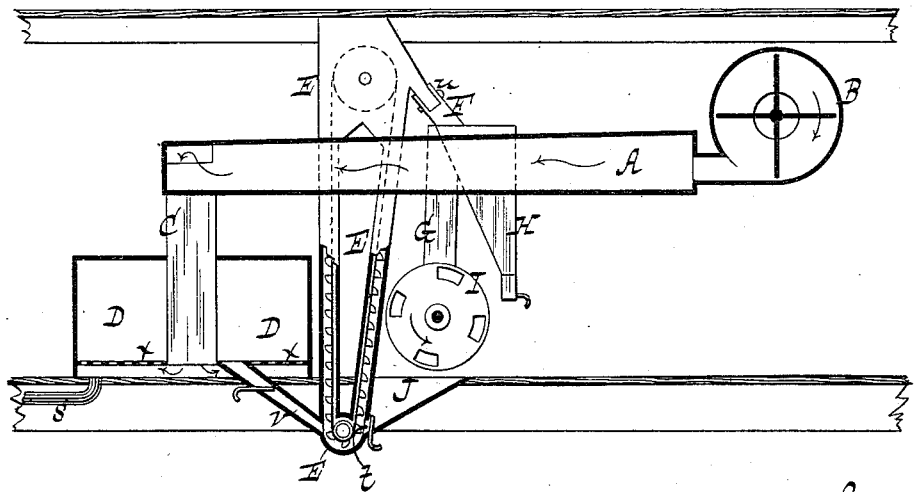
Fig. 2
Fig. 4
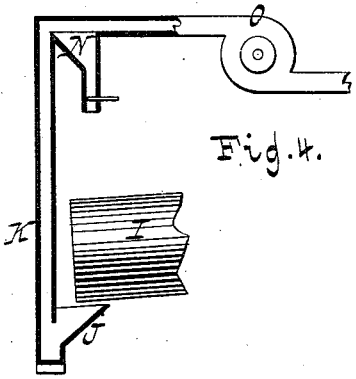
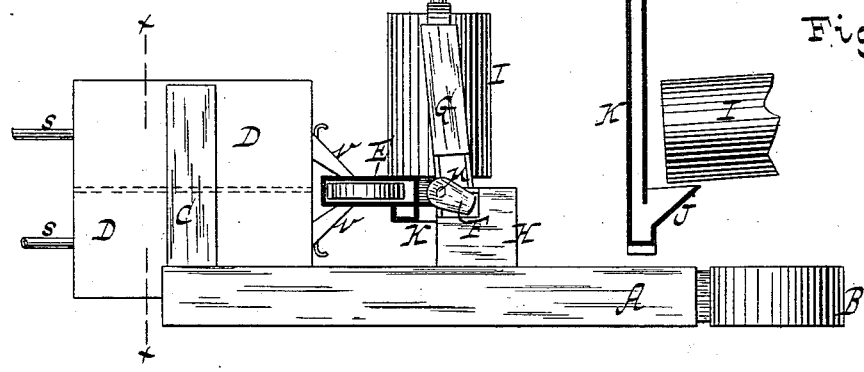
Fig. 3
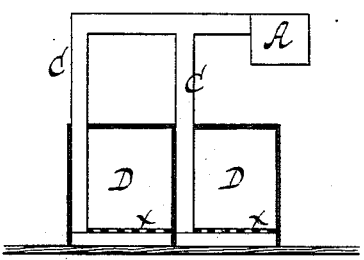
Witnesses.
Chas. Wahlers
William Miller
Inventor.
G. S. Hungerford
G. W. Hungerford
by Van Santvoord & Hauff
their Attys.

UNITED STATES PATENT OFFICE.

GEORGE W. HUNGERFORD AND GEORGE S. HUNGERFORD, OF NEW YORK, N. Y.

MACHINE FOR TREATING AND BAGGING COFFEE.

SPECIFICATION forming part of Letters Patent No. 259,545, dated June 13, 1882.

Application filed January 19, 1882. (No model.)

*To all whom it may concern:*

Be it known that we, GEORGE W. HUNGERFORD and GEORGE S. HUNGERFORD, both citizens of the United States, residing at New York, in the county and State of New York, have invented new and useful Improvements in Machines for Treating and Bagging Coffee, &c., of which the following is a specification.

This invention consists in a machine wherein coffee or other similar material may be treated with air, oxygenated, heated, or otherwise prepared, and conducted to a bagging-hopper or conducted into and through a scourer and then to the bagging-hopper, as hereinafter fully explained.

This invention is illustrated in the accompanying drawings, in which Figure 1 represents a side view, partly in section. Fig. 2 is a plan or top view, partly in section. Fig. 3 is a cross-section of the coffee-bins on the line $x$ $x$, Fig. 2. Fig. 4 is a broken elevation, partly in section, illustrating a suction apparatus to be used in connection with the receiving-hopper to free the coffee of dust, &c.

Similar letters indicate corresponding parts.

The letter A designates a chamber, having connected to one end thereof a fan-blower, B, and forming a receptacle for the substance to be used in the preparation of the air for treating the coffee or other material. From the discharge end of this chamber A extend flues C, whereby it is connected to the coffee-bins D, two or more in number, these bins being constructed respectively with a perforated false bottom, $x$, below which the flues communicate with the bins. From the false bottom of each of the bins D extends a chute, $v$, connecting the same to an elevator, E—namely, to the leg of the elevator, the latter consisting essentially of an endless traveling belt carrying buckets. At its upper or discharge end the elevator E is provided with a spout, F, which is pivoted, as at $u$, to swivel or turn in a lateral direction, so that it can be brought over either of two hoppers, G H, causing the elevator to discharge therein. The hoppers G H are placed adjacent to each other, and G feeds to the scourer I, which consists of a revolving cylinder or cylinders operating in a well-known manner, while H is a medium for discharging the material into bags.

At the discharge end of and below the scourer I is a hopper, J, for receiving the material therefrom, and this hopper is connected to the elevator E by a bottom opening, $t$, approximately opposite to the chutes $v$ of the bins. Suitable gates are arranged in the receiving-hopper J, the chutes $v$, and the flues C, respectively, and a steam-pipe, $s$, is connected to each of the bins, so that, if desired, the coffee may be steamed for swelling or opening the pores thereof.

In applying the machine to use the desired substance is placed in the chamber A and the fan-blower B is set in motion, thus forcing a current of air through the chamber and up into the bins D through their false bottoms to act on the material therein; and when more than one bin is used the material in one may be treated while that in the other is being discharged. The material discharges from the bins through the chutes $v$, and being thereby conducted to the elevator E, it is carried up and emptied through the swivel-spout F either into the feed-hopper G or the bagging-hopper H, according to the position of the spout. When the material is emptied into the feed-hopper G it thence passes into the scourer I, wherein it is freed of impurities, and discharging therefrom it is caught in the receiving-hopper J, by opening which it may again be conducted to the elevator E, and finally deposited by the spout F into the bagging-hopper H, to be thence run into bags.

If desired, the chamber A may be heated so that hot air is forced into the air-space below the false bottoms $x$ of the bins, serving not only to treat the coffee, but also to lessen the condensation of the steam when such is used. If desired, moreover, a suction-fan may be substituted for the fan-blower B, or any other known forcing device may be used in lieu thereof.

From the receiving-hopper J extends a suction-flue, K, Figs. 2 and 4, which is bent or deflected sidewise at a suitable point, and in the horizontal limb of which is arranged a trap, N, consisting of a downwardly-projecting hopper provided with a suitable gate, the flue connecting with a suction-fan, O. The trap N is situated immediately next to the bend in the suction-flue. As the material falls from the scourer I into the receiving-hopper J, any dust or other foreign matter mixed therewith is carried off by the suction-flue K, and in case any of the material escapes into the flue it is caught in the trap N, whence it may be removed at pleasure. The exact location of the suction-pipe K and suction-fan is not material, so long as the lower end of the suction-pipe connects with the receiving-hopper J, as for example, as shown in Fig. 4.

It should be remarked that the scourer I is also sometimes known as a "milling-machine," while a polisher, moreover, may be substituted for the scourer.

What we claim as new, and desire to secure by Letters Patent, is—

1. The combination, substantially as hereinbefore set forth, of the coffee-bins having perforated false bottoms, the air-chamber communicating with the coffee-bins beneath their false bottoms, the fan-blower connected with the air-chamber, the elevator, a passage for conducting the coffee from the bins to the elevator, and devices, such substantially as set forth, for delivering the coffee from the elevator either to a miller or polisher or directly to a receiving-hopper.

2. The combination, substantially as hereinbefore set forth, of the scourer or polisher and its feed-hopper, the bagging-hopper located adjacent to the feed-hopper, the elevator having a swivel-spout, whereby it is adapted to discharge into either the feed-hopper or bagging-hopper, the receiving-hopper at the discharge end of the scourer, connected to the elevator, and the coffee-bins connected to the elevator, for the purpose specified.

3. The combination, substantially as hereinbefore set forth, of the receiving-hopper, the suction-flue extending from the receiving-hopper, and the trap in the suction-flue with the scourer and elevator, for the purpose set forth.

In testimony whereof we have hereunto set our hands and seals in the presence of two subscribing witnesses.

GEORGE W. HUNGERFORD. [L. S.]
   GEORGE S. HUNGERFORD. [L. S.]

Witnesses:
 J. VAN SANTVOORD,
 CHAS. WAHLERS.